United States Patent [19]

Ruggles et al.

[11] 4,101,786

[45] Jul. 18, 1978

[54] MASTER-SATELLITE IRRIGATION CONTROL SYSTEM WITH REMOTE PROPORTIONAL TIMING

[75] Inventors: Richard L. Ruggles, Mount Baldy; Vinod Panday, Covina, both of Calif.

[73] Assignee: Clemar Manufacturing Corporation, Glendora, Calif.

[21] Appl. No.: 695,908

[22] Filed: Jun. 14, 1976

[51] Int. Cl.² .............................................. H02J 1/06
[52] U.S. Cl. ................................ 307/38; 307/132 M; 307/140; 137/624.2
[58] Field of Search ................. 307/38, 40, 41, 132 R, 307/132 M, 140, 141, 141.4, 116, 118; 137/624.2

[56] References Cited

U.S. PATENT DOCUMENTS

| | | | |
|---|---|---|---|
| 3,230,401 | 1/1966 | Stelter | 307/132 M |
| 3,591,850 | 7/1971 | Holm | 307/141 |
| 3,604,943 | 9/1971 | Bayer | 307/41 |
| 3,989,066 | 11/1976 | Sturman | 137/624.2 |

Primary Examiner—Robert K. Schaffer
Assistant Examiner—William L. Feeney
Attorney, Agent, or Firm—Fulwider, Patton, Rieber, Lee & Utecht

[57] ABSTRACT

Apparatus, and a related method, for proportionately varying from a master unit the durations of irrigation at a plurality of valve stations controlled by a number of satellite units, and for transmitting over a single pair of wires control signals for starting a programmed sequence of valve operations at all of the satellites in a selected one of two groups of satellites, or for resetting all of the satellites to a "home" position. One disclosed embodiment includes adjustable timing circuitry in the master unit to generate a timing signal which is transmitted to the satellite units over a separate wire, and is utilized to vary the duty cycle of a station timing motor which measures the durations of irrigation. In an alternate embodiment, station timing at each satellite is measured by means of a digital pulse counter, and the irrigation times at all of the stations can be varied to the same degree by adjustment of a variable-frequency pulse generator at the master unit.

16 Claims, 9 Drawing Figures

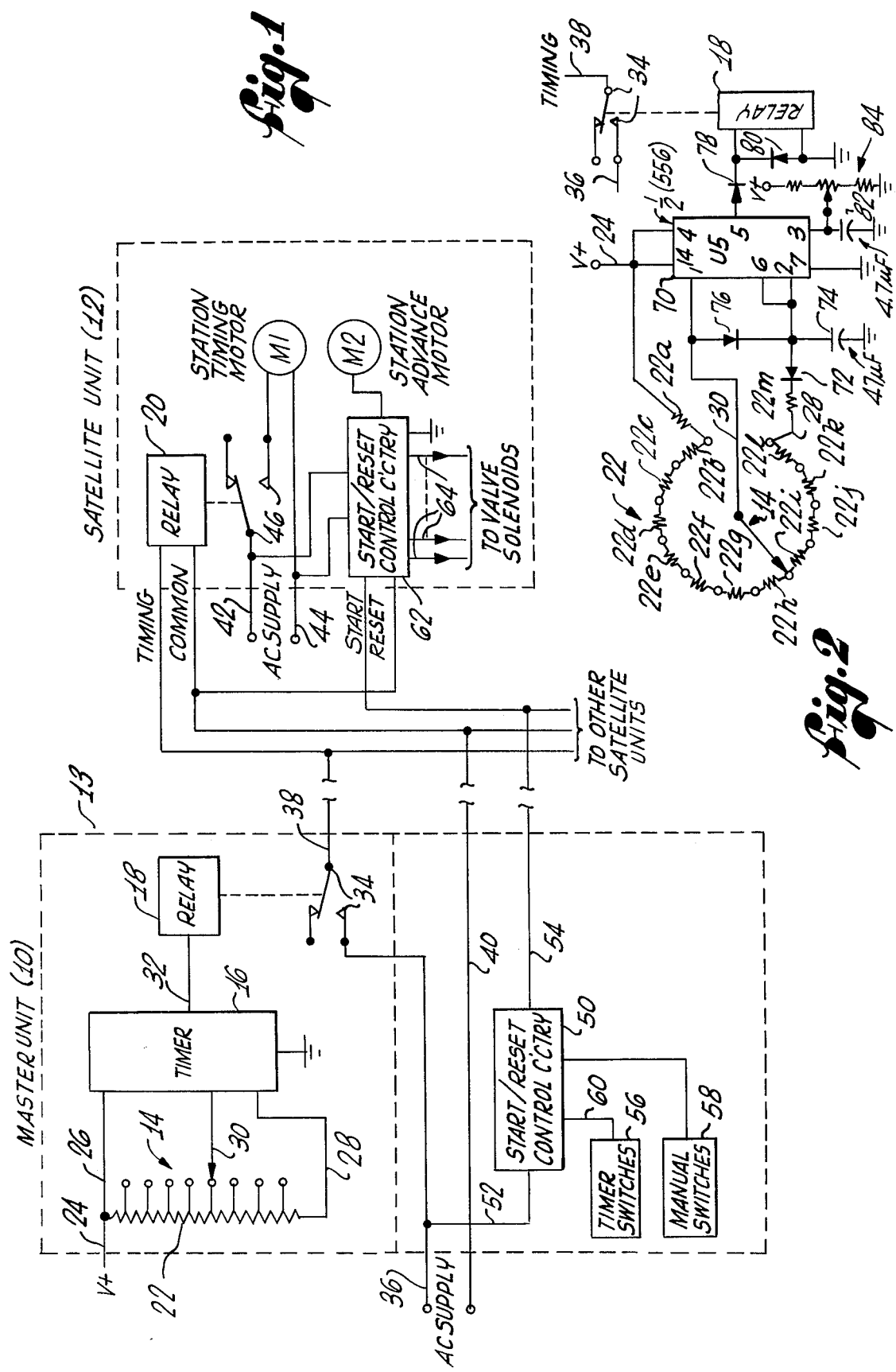

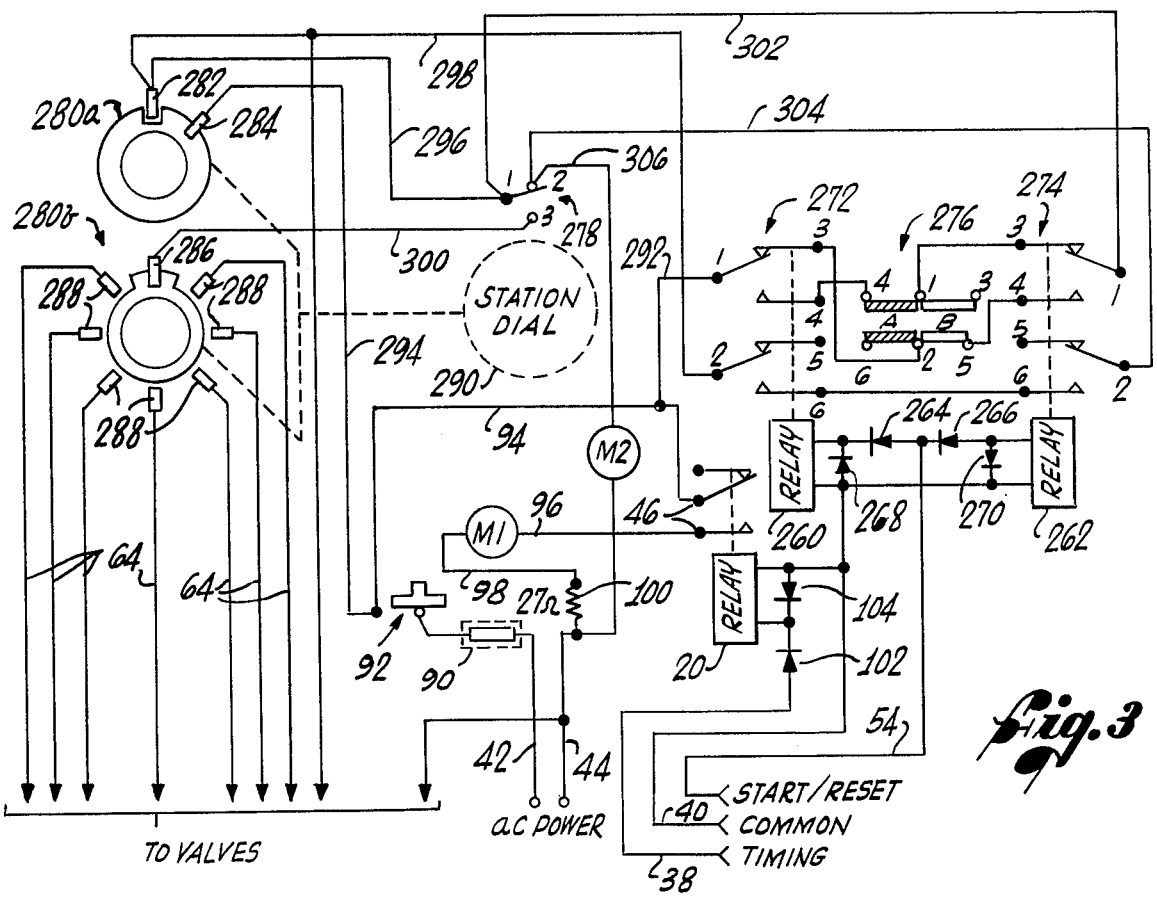
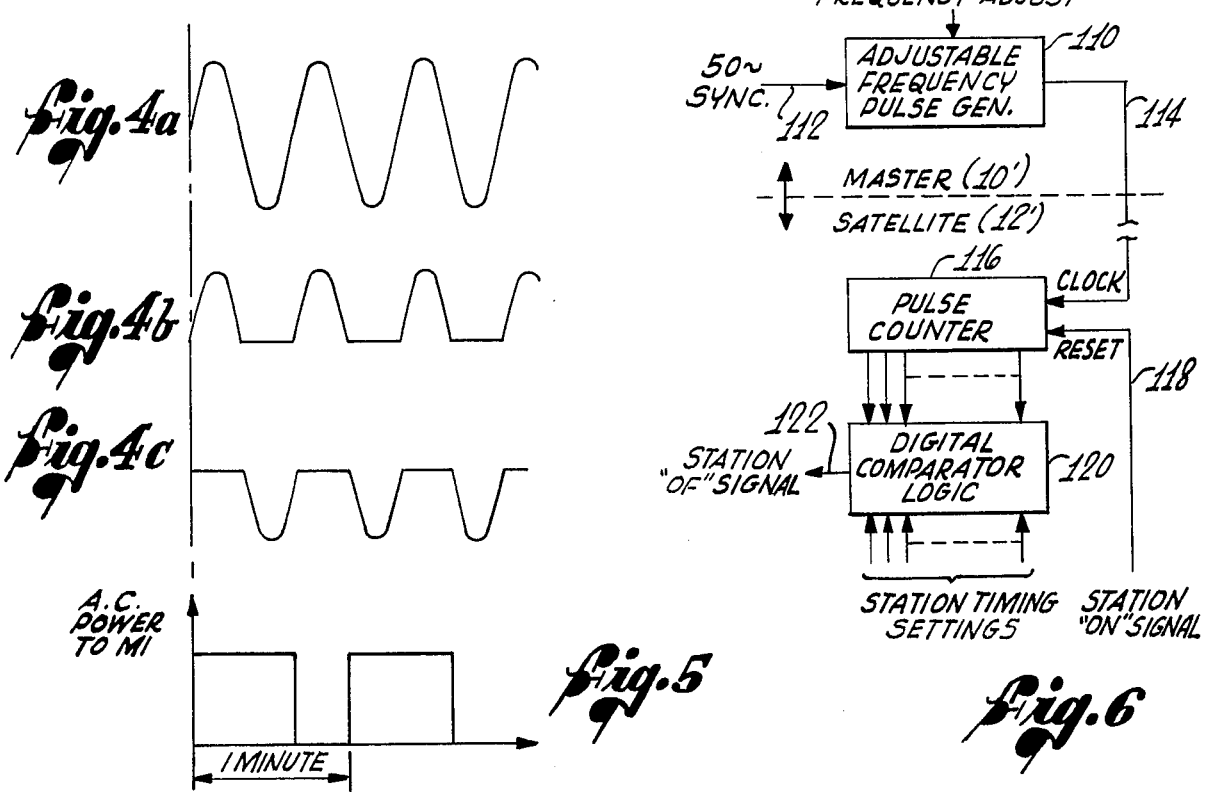

MASTER-SATELLITE IRRIGATION CONTROL SYSTEM WITH REMOTE PROPORTIONAL TIMING

BACKGROUND OF THE INVENTION

The present invention relates generally to irrigation control systems, and, more particularly, to systems for the control of relatively large irrigation installations in which there is a master control unit and a number of remotely located control units connected to the master and known as satellite control units. Each satellite unit controls a number of irrigation valves, and, depending on the particular design, some degree of control of the scheduling and timing of the valve operations is retained in the master unit. Master-satellite control systems of this general type have become the accepted technique for the controlled irrigation of relatively large areas, such as golf courses.

Master-satellite systems of the prior art suffer from two principal disadvantages. First, they provide no means for proportionately varying the durations of operation of all of the irrigation valves from the master unit. In general, the duration of irrigation desired at each valve or station will vary according to differing local factors, such as terrain and vegetation. The duration of watering should, however, also be adjusted with changing weather and soil conditions. In irrigation systems of the prior art, an overall change in irrigation duration, e.g., a reduction of 10% at each valve, could only be effected by appropriately adjusting each of a large number of station timers by means of which the durations of irrigation at each station are controlled, or by making an adjustment at each of the satellite units. This is clearly a time-consuming and inefficient method of operation, and is inconsistent with the general philosophy behind a master-satellite system, i.e., to achieve centralized control.

The second disadvantage of master-satellite systems of the prior art relates to the means employed for supplying control signals from the master unit to the satellite units. The stations at each satellite unit are usually activated in a timed sequence. Control signals from the master unit are utilized to start the sequences of operations at the satellites. Once started, each satellite unit is advanced under control of its own program of operations from one station to the next. Control signals from the master unit are also utilized to advance the satellite through all of the stations to a starting or "home" position in the sequence. In some master-satellite systems, each of the satellite units may be designated, by a manual switch on the unit, as an 1 A' or a 'B' unit. Two master timing programs are then provided at the master unit, one for the 'A' group of satellites and the other for the 'B' group, the master timing programs being used to control the generation of the control signals which start the timed sequences of operations at the 'A' and 'B' groups of satellites. This feature adds flexibility to the system, since it allows for two independent irrigation programs to be in operation, under the control of a single master-satellite system. In this type of system, control signals must be transmitted from the master unit to the satellite units when it is desired to start the satellite units of a particular group, or to reset the units of both groups to the starting position in their programs. Typically, master-satellite systems of the prior art have included separate control lines for the 'A' and 'B' control signals, and a common return line, thus requiring at least three control lines between the master unit and the satellite units. Since the number and overall length of electrical conductors in irrigation systems is a substantial cost factor, any reduction in the number of control lines represents a significant improvement.

It should be apparent from the foregoing that there is a significant need in the field of irrigation control systems for a master-satellite system which provides a centralized proportional timing control at the master unit, and which reduces the number of control lines or conductors between the master unit and satellite units. The present invention fullfills these needs.

SUMMARY OF THE INVENTION

The present invention resides in remote proportional timing apparatus, and a related method, for use in an irrigation system of the master-satellite type. Basically, and in general terms, the apparatus of the invention includes timing signal source means located in a master control unit, and timing signal utilization means located in a satellite control unit and connected to operate in response to signals from the timing signal source means. The timing signal utilization means includes means for controlling the durations of energization of a plurality of irrigation valves, and, more importantly, the invention includes means for controlling the timing signal source means, to vary the rate of its operation, and thereby to vary selectively and proportionately the durations of energization of the plurality of irrigation valves. In effect, the invention provides a single control for varying the durations of energization of all of the valves in the system to the same proportionate degree. For example, it would be possible to double all of the irrigation times in the event of particularly dry weather, or to reduce the irrigation times by some percentage to compensate for natural irrigation by rain.

In one preferred embodiment of the invention, the timing signal source means includes timing circuit means for generating a timing signal comprising pulses of either fixed period and variable width, or fixed width and variable period. The means for controlling the timing signal source means includes variable electrical impedance means for controlling the width or frequency of the signals. The timing signal source means in this embodiment also includes switching means responsive to the timing signals from the timing circuit means, to transmit a supply voltage to the satellite unit.

The timing signal utilization means in the satellite unit of this embodiment includes a synchronous motor operable to time the durations of irrigation for each of the valve stations, and switching means responsive to received timing signals and operative to connect and disconnect a supply voltage to the synchronous motor in accordance with the state of the signals generated in the timing circuit means. Accordingly, the synchronous motor in the satellite unit will have a duty cycle which depends upon the adjustment of the timing circuit means in the master unit. For example, it could be arranged that the synchronous motor controls the station timing at a normal rate when its duty cycle is 50%. If the duty cycle is changed to 100%, the motor will run at an effective average speed of twice the normal speed, and the irrigation times will be thereby halved. If the duty cycle is reduced to 25%, for example, the motor will run at effectively one-half of its normal speed, and the irrigation times will all be effectively doubled.

The method of the invention includes the steps of generating a two-stage timing signal at the master unit, transmitting the timing signal to the satellite units, and utilizing the timing signals received at each satellite unit to determine the rate at which valve irrigation times are to be measured. The method may also include the steps of varying the proportion of time that the timing signal is in a particular state, and varying the duty cycle of a timing motor in accordance with the timing signal. In another variation of the method, there are included the steps of varying the frequency of the timing signal, and measuring valve irrigation times by counting pulses of the timing signal.

In accordance with another aspect of the invention, only two control signal conductors between the master and satellite units are needed to transmit signals to the satellite units indicating either that the satellite units in a selected one of two groups of satellite units are to be started, i.e., that the satellite units in the selected group are to be advanced to the first stations in their timed sequences of operation, or that the satellites of both groups are to be returned to a reset or "home" position in their timed sequences of operation. In accordance with this aspect of the invention, the apparatus includes a pair of electrical conductors between the master unit and a plurality of satellite units, means located in the master unit for generating a "start" control signal for transmission over the conductors when a selected one of two groups of satellite units is to be started, means also located in the master unit for generating a "reset" control signal on the same pair of conductors when all of the satellite units are to be reset to their "home" positions, means at each of the satellites for decoding control signals received on the pair of conductors, and means responsive to the decoding means for starting the timed sequence of operations at the satellite unit, or for resetting the unit to its "home" position in the sequence of operations.

In a presently preferred embodiment of the invention, the "reset" signal is a sinusoidal alternating-current signal, and the "start" signals comprise either the positive-going portions or the negative-going portions of the sinusoidal signal, depending upon which group of satellite units is to be controlled. Basically, the means at each of the satellites for decoding the control signals comprises first and second switching means responsive, respectively, to positive-going and negative-going portions of the control signals on the pair of conductors. The apparatus at each of the satellite units also includes a selector switch for selecting which group of satellites the particular satellite is designated as belonging to. The switching means and the selector switch are coupled in such a manner that, if the selector switch is in an 'A' position and the first switching means is actuated, then the unit will be started, i.e., advanced from the "home" position to the first station in the timed sequence. Similarly, if the selector switch is in a 'B' position and the second switching means is actuated, the unit will also be started. If both first and second switching means are actuated together, indicating a reset signal, the satellite unit will be advanced until the home position is reached, regardless of the position of the selector switch.

Since only two conductors are required to provide the aforedescribed functions of starting the satellite units and returning them to the "home" position, it is possible to incorporate the proportionate timing feature by the addition of only one additional conductor. The proportionate timing feature then utilizes the additional conductor and a common return conductor also used by the "start" and "reset" signals.

It will be appreciated from the foregoing that the present invention represents a significant advance in the field of master-satellite irrigation systems. In particular, the invention provides for a single control for the proportionate variation of irrigation times at a plurality of valve stations, thereby eliminating the need for adjusting a number of different controls at the stations or satellites. Furthermore, the invention provides for "start" and "reset" signals, the "start" signals being directed to a selected one of two groups of satellites, and the signals being transmitted on only a single pair of conductors between the master unit and the satellite units. Other aspects and advantages of the present invention will become apparent from the following more detailed description, taken in conjunction with the accompanying drawings.

BRIEF DESCRIPTION OF THE DRAWINGS

FIG. 1 is a simplified schematic diagram showing a master-satellite irrigation control system embodying the present invention;

FIG. 2 is a detailed schematic diagram of timing circuitry in the master unit of FIG. 1;

FIG. 3 is a detailed schematic diagram of a satellite unit of FIG. 1;

FIGS. 4a –4c illustrate the control signal waveforms for a "reset" signal, a "start A" signal, and a "start B" signal, respectively;

FIG. 5 illustrates the waveform of a timing signal generated in the master unit of FIG. 1;

FIG. 6 is a simplified block diagram of an alternate embodiment of the invention apparatus for proportional timing.

DESCRIPTION OF THE PREFERRED EMBODIMENTS

Figure 7:
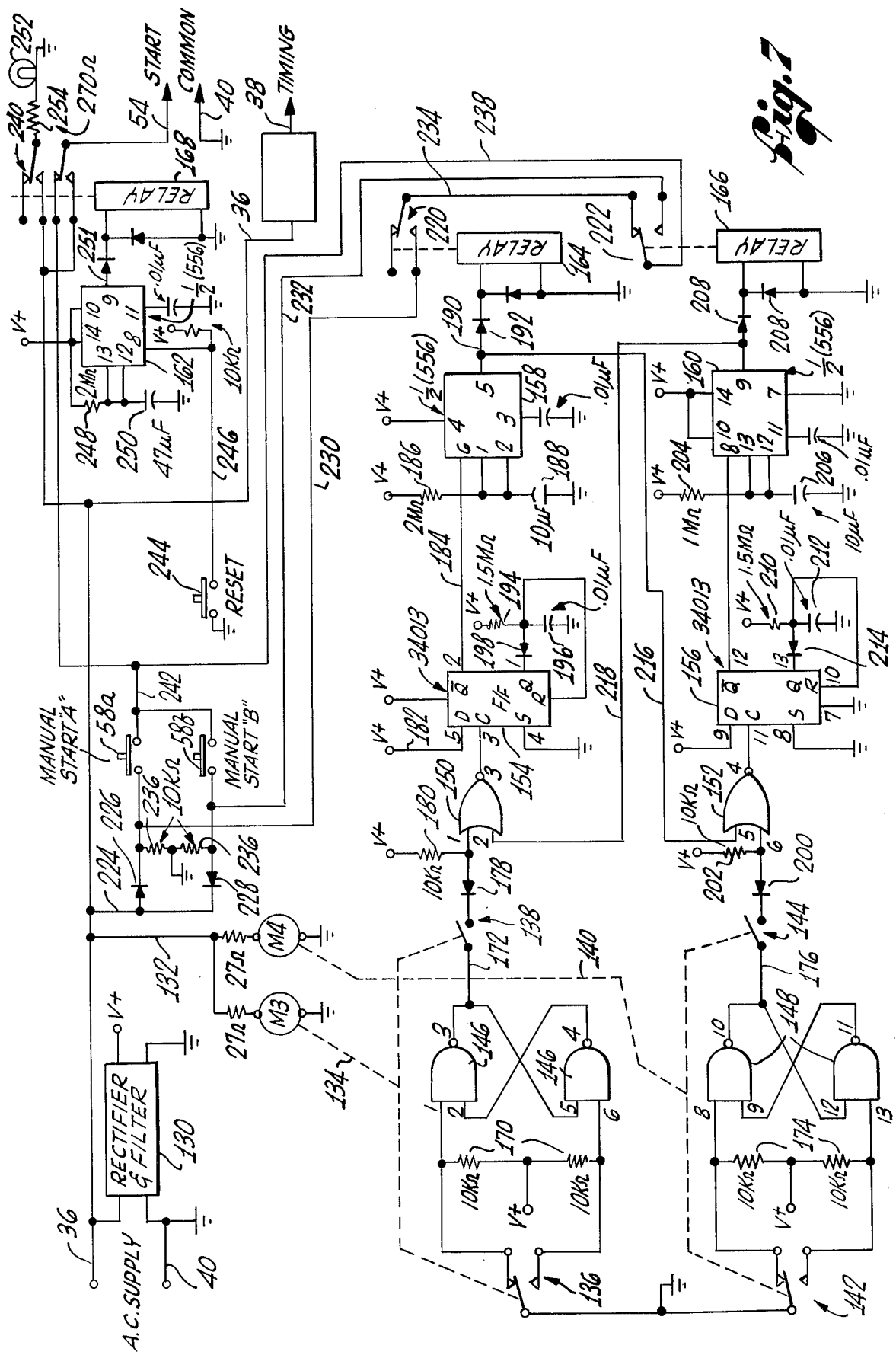
FIG. 7 is a detailed schematic diagram of the master unit of FIG. 1, excluding the details of timing circuitry shown in FIG. 2.

As shown in the drawings for purposes of illustration, the present invention is embodied in an irrigation control system having a master control unit, indicated by reference numeral 10 in FIG. 1, and one or more satellite control units 12. Each of the satellite units 12 controls the operation of a plurality of solenoid-actuated irrigation valves (not shown) in accordance with a sequence of operations timed at the satellite unit itself, but initiated from the master control unit 10. Typically, each satellite unit 12 has a plurality of positions or stations, each station being associated with one or more valves, and the satellite unit is made to advance from station to station in a sequence of operations under the control of a timing mechanism (not shown) in the satellite unit. A common technique is to arrange for the timing mechanism in the master unit to generate a "start" signal whenever it is time, as indicated by a master timing program, to start the timed sequences of operations at the satellites. Once a satellite has been started by such a "start" signal, the irrigation or watering times at the stations associated with that satellite are determined by the timing mechanism located in the satellite unit itself and driven by a station timing motor M1. In a typical master-satellite system, then, the start of a program of valve operations is determined and controlled at the master unit 10, but the station times, or durations of irrigation at each station, are determined and varied at the satellite units 12.

power is supplied to the satellite unit through lines 42 and 44. Line 42 is connected through a fuse 90 and power switch 92, and thence by line 94 to one of the relay contact terminals 46 associated with the relay 20. The contact terminals 46 are electrically connected by actuation of the relay 20. From the other of the contact terminals 46 there is a connection through line 96 to the station timing motor M1, and thence through line 98 and a resistor 100, to the other power line 44. The timing signal line 38 is connected through a diode 102 to one terminal of the relay 20, so that current can flow from the timing signal line to the relay terminal. The common line 40 is connected to the other terminal of relay 20, and a blocking diode 104 is connected to prevent current flow from the timing signal line 38 to the common line 40. The diodes 102 and 104 operate as a rectifier, so that the relay 20 may be operated by an alternating-current signal. It will be appreciated that the station timing motor M1 will be energized in accordance with the signals on the timing signal line 38, and will therefore operate on a duty cycle determined solely by the position of the selector switch 14 in the master unit 10. Moreover, since the station timing motor M1 measures the times of irrigation for all of the valves controlled by the satellite units 12, operation of the selector switch 14 provides for the control of the irrigation times of all of the valves in the system to the same proportionate degree.

FIG. 6 illustrates in simplified form an alternate embodiment of the proportionate timing aspect of the present invention. In this embodiment, a master unit, indicated as 10', includes an adjustable-frequency pulse generator 110 which may be synchronized with a convenient constant frequency, as shown at 112, and which supplies a continuous train of pulses on output line 114 to a satellite unit 12'. The satellite unit includes a pulse counter 116 which is clocked by the train of pulses on line 114. When the valves associated with a particular station are turned on, a suitable signal is supplied over line 118 to reset the pulse counter 116, which then begins counting upwardly from zero, at a rate determined by the rate of the pulse generator 110 in the master unit 10'. Also included in the satellite unit 12' is digital comparator logic 120, which continually compares the content of the pulse counter 116 with a station timing digital value selected for that particular station. On a successful comparison, a station "off" signal is generated, as shown at 122. It will be apparent that the station timing for the satellite unit 12' can be adjusted by varying the frequency of the pulse generator 110, and that the station timing of all of the stations associated with all of the satellites 12' in the system can be varied by adjusting the frequency of the pulse generator 110.

As briefly described in connection with FIG. 1, the apparatus of the present invention is capable of transmitting "start" and "reset" signals over lines 54 and 40 to start a selected one of two groups of satellite units 12, or to reset the units back to a "home" position. These aspects of the invention will now be explained in more detail with reference to FIG. 7.

The alternating-current supply voltage to the master unit 10 is connected to a conventional rectifier and filter 130, for generating a direct-current supply voltage (V+) utilized throughout the logic of FIG. 7. One of the alternating-current supply lines is grounded, and is utilized as the common supply line 40. The other alternating-current supply line 36 is also connected by line 132 to two timing motors M3 and M4, the operation of which will not be described in detail, but is related to the timing of both days and hours in two separate programmed sequences of irrigation, relating to the two selectable groups of satellite units 12. As shown by broken lines 134, the motor M3 controls two switches 136 and 138, and, as shown by broken lines 140, the motor M4 controls corresponding switches 142 and 144. The start/reset control circuitry of FIG. 7 in addition includes two pairs of cross-coupled NAND gates 146 and 148, two NOR gates 150 and 152, two flip-flops 154 and 156, three integrated-circuit timers 158, 160 and 162, three relays 164, 166 and 168, and various circuit components to be described.

It will be appreciated by those of ordinary skill in the electronic logic art that the cross-coupled NAND gates 146 are conventionally connected to form a flip-flop. The switch 136 applies a low or ground potential to one of the NAND gates 146, depending upon the position of the switch, and a high voltage level is applied to the other of the NAND gates through one of the resistors 170. The flip-flop formed by the NAND gates 146 has an output line 172 connected to the switch 138, the output signal on this line being normally high, i.e., when switch 136 is in its normal or upward position as shown in FIG. 7. When the motor M3 advances the timer controlling switch 136 to such a position as to actuate the switch, the flip-flop formed by the NAND gates 146 changes state, and the output on line 172 falls to a low level. The operation of NAND gates 148 in conjunction with switch 142 is similar, there being a corresponding pair of resistors 174 coupling a high input voltage to the inputs of the NAND gates. When switch 142 is actuated and moved to its lower position, as viewed in FIG. 7, a low-level output is produced on output line 176 from the flip-flop comprising NAND gates 148.

Output line 172 from the NAND gates 146 is connected through the switch 138 and to the negative terminal of a diode 178, the positive terminal of which is connected through a resistor 180 to a high voltagelevel (V+), and is also connected as one input to the NOR gate 150. The output of the NOR gate 150 is connected to the clocking terminal of flip-flop 154, which is a 'D' flip-flop having its D terminal permanently connected to a high voltage level, as shown at 182. The inverse output ($\bar{Q}$) of the flip-flop 154 is connected by line 184 to the trigger terminal of the timer 158, which is of the same type as timer 70 (FIG. 2), previously discussed in connection with the generation of timing signals. The timer 158 has an external resistor 186 and capacitor 188, and functions basically as a oneshot circuit to produce, when triggered, a positive output signal on output line 190 for a time period determined by the resistor 186 and capacitor 188. The output line 190 is connected through a pair of blocking diodes 192 to the relay 164, which is designated the 'A' relay.

The flip-flop 154 has associated with it a self-resetting circuit comprising a resistor 194 and capacitor 196 connected in series, the resistor having its other terminal supplied with a high voltage level, and the capacitor having its other terminal grounded. The junction of the resistor 194 and capacitor 196 is connected to the positive terminal of a diode 198, the negative terminal of which is connected to the Q output terminal of the flip-flop 154. The junction of the resistor 194 and the capacitor 196 is also connected to the reset terminal of the flip-flop 154. It will be appreciated that, so long as the Q output of flip-flop 154 is at a low level the signal applied to the reset terminal of the flip-flop will also be In accordance with the present invention, station timing, i.e., the durations of operation of all of the valves in the system, can be varied from a single point in the master unit 10, by means of timing circuitry 13. The timing circuitry includes a selector switch 14, a timer 16 and a relay 18, and operates in cooperation with a corresponding relay 20 in the satellite unit 12, utilized to control operation of the station timing motor M1.

More specifically, the selector switch 14 has a plurality of fixed contacts connected to a series string of resistors 22, one end of which is supplied with a positive supply voltage, as indicated at 24, and both ends of which are connected to the timer 16 via lines 26 and 28, respectively. The selector switch 14 has a moving contact arm which is connected via line 30 to the timer 16. The function of the timer 16 is to provide an "on/off" signal similar in shape to the one illustrated in FIG. 5. The signal, transmitted over line 32 to the relay 18, will assume an "on" condition periodically, for example, every minute, and will assume an "off" condition after a time determined by the values of the series string of resistors 22 and the position of the selector switch 14. An "on" signal on line 32 to the relay 18 operates to close a pair of normally open contacts 34, and to thereby connect one terminal of an alternating-current power supply, indicated at 36, with a timing signal conductor 38 between the master unit 10 and satellite unit 12. Another conductor 40 completes the alternating-current circuit and is utilized as a common line for the transmission to the satellite unit 12.

Both the timing line 38 and common line 40 are connected to the relay 20 in the satellite unit 12, which has its own separate alternating-current power supply on lines 42 and 44. Line 44 is connected directly to the motor M1, and line 42 is connected through relay contacts 46 to the other terminal of the motor M1. When the relay 20 is closed by the presence of an "on" signal on the timing signal conductor 38, the normally open contacts 46 are closed, and the motor M1 is energized. It will be seen that the duty cycle of the motor M1 varies in direct relation to the signal generated on line 32 from the timer 16, and that the duty cycle can, therefore, be varied by appropriate selection of the position of the selector switch 14.

The master unit 10 also includes start/reset control circuitry, indicated at 50, to which one of the power supply lines 36 is connected, by line 52, and from which is obtained a "start/reset" signal on line 54 between the master unit 10 and satellite unit 12. The start/reset control circuitry is actuated by timer switches 56, or manual switches 58, to generate an appropriate signal on line 54 and the common line 40. In particular, the signal on line 54 may comprise either the positive-going or the negative-going halves of a sinusoidal waveform, as indicated in FIGS. 4b and 4c, respectively, or may be a complete sinusoidal waveform as indicated in FIG. 4a. The timer switches 56 generate control signals on line 60 to the control circuitry 50 whenever a programmable master timer (not shown) indicates that satellite units of either an 'A' or 'B' designation are to be started on a new irrigation cycle. Each satellite unit 12 may be designated an 'A' or a 'B' unit, so that the master unit 10 may have two separate programs of starting times, one for the 'A' satellite units and one for the 'B' satellite units. The manual switches 58 can be used to override the timer switches 56, and start either the 'A' satellite units or the 'B' satellite units, or to reset all of the satellite units to a home position to begin a new programmed sequence.

Each satellite unit 12 also includes start/reset control circuitry, indicated at 62, and a station advance motor M2. The start/reset control circuitry 62 receives the "start/reset" control signals on lines 54 and 40 from the master unit 10, and generates control signals on a plurality of lines 64 to the valve solenoids (not shown), as well as controlling flow of current to the motor M2 in accordance with the received control signals.

Generation of the timing signals in the master unit 10 is shown in more detail in FIG. 2, in which the resistor string 22 is shown as comprising thirteen series-connected elements 22a–22m. The timing includes an integrated-circuit timer 70, and various other circuit components to be described. The timer 70 may be any suitable circuit connectable for free-running operation. The one illustrated is part number RC556 or RM556, manufactured by Raytheon Semiconductor Division, Mountain View, Calif. 94042. Essentially, the timer 70 produces a positive output signal from its pin #5 when triggered by a negative-going trigger pulse on pin #2, to which the resistor string 22 is connected through a blocking diode 72, connects to permit flow of current in a direction toward the resistor chain 22. An external capacitor 74 is connected from pin #2 to ground, and, with the resistor chain 22, determines the time constant of the circuit.

The moving contact of the selector switch 14 is connected by line 30 to pin #1 of the timer 70, which is a discharge terminal connectable internally to ground. Another blocking diode 76 is connected between pin #1 and pin #2 to permit current flow only toward the capacitor 74. It will be seen that, with the switch 14 in the position shown, the capacitor 74 can be charged from the source of positive voltage, at 24, through resistors 22a–22h and through diode 76. Charging current flow through resistors 22i–22m is blocked by the diode 72. The flow of discharge current from capacitor 74 is through the diode 72, resistors 22m–22i, and through the discharge terminal (pin #1) to ground.

In operation, when the capacitor 74 is being charged, the discharge terminal (pin #1) is not grounded, and the output (on pin #5) is high. When the voltage on the capacitor 74, which is also connected to a threshold terminal (pin #2), reaches a certain preselected value, the output on pin #5 falls to zero, and the discharge terminal is grounded to discharge the capacitor 74. The output on pin #5 remains zero until the capacitor 74 has discharged to a certain level. It will be appreciated that, since the "on" time of the output signal is determined by one portion of the resistor string 22, and the "off" time is determined by the remaining portion of the resistor string 22, then the total cycle time of the output waveform will be constant, and the duty cycle will be determined by the position of the selector switch 14. The output signal on pin #5 is connected to relay 18 through another diode 78, one terminal of the relay being grounded, there being yet another diode 80 connected between the two relay terminals. The diodes 78 and 80 are merely to prevent undesired feedback signals from reaching the timer 70. A control pin (pin #3) of the timer 70 is connected to ground through another capacitor 82, and is supplied with an adjustable voltage, from voltage divider 84, to provide an adjustment of the total cycle time of the output signal.

As shown in FIG. 3, which is the detailed schematic diagram of the satellite unit 12, alternating-current low. However, when the Q output of flip-flop 154 becomes high, the capacitor 196 charges at a rate determined by the value of the capacitor and its associated resistor 194, and when the voltage on the capacitor reaches a sufficiently high value, the flip-flop will reset itself to a low Q output.

In similar fashion to that described for actuation of the 'A' relay 164, the 'B' relay 166 is actuated as follows. The output line 176 from the flip-flop comprising the NAND gates 148 is connected through the switch 144, through a diode 200, and applied as an input to the NOR gate 152. This input is also connected to a high voltage level through a resistor 202, and the output of the NOR gate 152 is connected to the clock terminal of the flip-flop 156. The inverse or $\overline{Q}$ output from flip-flop 156 is connected to the trigger terminal of the timer 160, the output of which is connected to the 'B' relay 166. The timer 160 also includes an external timing circuit comprising a resistor 204 and capacitor 206, and includes a pair of blocking diodes 208 in its output circuit to the relay 166. Flip-flop 156 also includes a self-resetting circuit comprising resistor 210, capacitor 212 and diode 214, these being connected and functioning in exactly the same manner as the corresponding elements associated with flip-flop 154.

In addition to the above-described connections of the components, the output of timer 158 is coupled by line 216 to an input terminal of NOR gate 152, and the output of timer 160 is coupled by line 218 to an input terminal of NOR gate 150. As will be discussed, these two connections operate in most instances to preclude the simultaneous operation of both of the circuits actuating 'A' and 'B' relays 164 and 166, respectively.

Briefly, the aforedescribed circuitry operates as follows. When the timing program associated with motor M3 determines that it is time to start all of the satellite units 12 (FIG. 1) designated as 'A' satellites, the switches 138 and 136 are both closed. In an actual embodiment, the switch 138 is a "day" switch and will be closed for the entire 24-hour period of a day in which watering is to be performed. The switch 136 is an "hour" switch and will be closed for some minutes beginning on the hour at which watering is to be initiated. In any event, when both switches 136 and 138 are simultaneously closed, the output on line 172 will, as has been described, fall to a low voltage level. When switch 138 is open, the high voltage level applied through resistor 180 maintains a high-level input to NOR gate 150, this resulting in a low-level output applied to the clocking terminal of flip-flop 154. However, with both switches 136 and 138 closed, the high-level input is drained off through resistor 180 and diode 178, and the output of NOR gate 150 rises to a high level, provided there is also a low level at its other input on line 218. This provides a rising clock pulse for application to the flip-flop 154, and gates the high input D value on line 182 to the output of the flip-flop. Accordingly, the inverse output $\overline{Q}$ falls to a low level, providing a trigger signal to the timer 158, and initiating a positive output on line 190 from the timer. This, in turn, actuates relay 'A' 164 for a predetermined period of time, which, in the presently preferred embodiment is approximately 30 seconds.

In a similar fashion, closure of switches 142 and 144 simultaneously effects actuation of the 'B' relay 166 for a predetermined period of time, which, in the presently preferred embodiment is approximately 15 seconds. The 'A' relay 164 initiates transmission of a "Start A" signal, and 'B' relay 166 initiates transmission of a "start B" signal, as will now be discussed in more detail.

The 'A' relay 164 actuates a single throw switch 220, and the 'B' relay 166 actuates a doublethrow switch 222. The power supply line 36 is connected by line 224 to the positive terminal of a diode 226 and to the negative terminal of another diode 228. The negative terminal of diode 226 is connected to one side of the switch 220, by line 230, and the positive terminal of diode 228 is connected by line 232 to the normally open contact of the double-throw switch 222. The normally closed contact of switch 222 is connected by line 234 to the other terminal of switch 220. The negative terminal of diode 226 and the positive terminal of diode 228 are also connected through a pair of equal resistors 236, the junction point of the two being grounded.

The function of the switches 220 and 222, as actuated by the 'A' and 'B' relays 164 and 166, is to connect either the positive-going portions or the negative going portions of a sinuosoidal waveform to the control signal line 54 connecting the master unit to the satellite units 12. It will be appreciated that positive-going portions of the power supply signal are conducted by the diode 226, and thence over line 230 to the switch 220. If the 'A' relay 164 is actuated, these positive-going signals will be transmitted through the switch, along line 234, through the switch 222 in its normally open (upward) position, and thence via line 238 from the moving contact of switch 222 to a normally closed contact of another switch 240, which is actuated by relay 168, as to be described. If relay 168 is not actuated, the positive halves of the signal pass through switch 240 to the line 54, and on to the satellite units 12.

If the 'B' relay 166 is actuated, and not the 'A' relay 164, the negative-going portions of the power signal will be transmitted through diode 228, along line 232, through switch 222, and along line 238 to the switch 240, which will be normally closed as before, and thence onto line 54 to the satellite units.

It will be appreciated that the cross-coupling of the 'A' and 'B' circuits by lines 216 and 218, will normally prevent their simultaneous operation. For example, if the 'A' relay 164 is energized, there will be an output signal on line 190, which will be transmitted over line 216 as a high-level signal input to the NOR gate 152. Then, even if switches 142 and 144 are closed, the high-level input to NOR gate 152 will maintain a low level on the clocking input of flip-flop 156, thereby preventing triggering of the timer 160, and actuation of the 'B' relay 166. However, if all four switches 136, 138, 142 and 144 are actuated to be closed simultaneously, it might be possible to actuate both relays 164 and 166 simultaneously before a blocking feedback signal could be propagated along line 216 or 218. In this event, it will be seen that the 'B' relay 166 takes priority over the 'A' relay 164, since the positive-going portions of the signal will encounter an open circuit at switch 222 when the 'B' relay is actuated. For this reason, the 'A' relay 164 is held closed for a longer period than the 'B' relay 166, so that, when the 'B' relay opens after transmitting the negative portions of the power signal, the 'A' relay 164 will remain actuated for some additional period of time so that the positive-going portions can be transmitted to send a desired "start A" signal.

Also included in the master unit 10 are a pair of manual switches 58a and 58b for manually initiating transmission of the "start A" or "start B" signals, respectively. The manual "start A" switch 58a is connected to the negative terminal of diode 226, and thence by line 242 to the switch 240, which, if relay 168 is not energized, transmits positive-going portions of the power signal onto line 54. In similar fashion, the manual "start B" switch 58b is connected to the positive terminal of diode 228, and thence by line 242 to the switch 240.

The "reset" signal is generated by a momentary reset switch 244, which has one terminal grounded, and has its other terminal connected by line 246 to the trigger terminal of timer 162. Timer 162 has an external resistor 248 and capacitor 250 connected in much the same manner as corresponding components associated with timers 158 and 160. When the reset switch 244 is momentarily actuated, a trigger signal on line 146 generates a positive output pulse on line 251 from the timer 162. This output signal energizes the relay 168 for a predetermined period of time, and thereby closes switch 240 for that period of time. When switch 240 is closed, the positive-going halves or negative-going halves of the power signal on lline 238 cannot be transmitted through the switch to line 54. Instead, line 54 is connected through switch 240 directly to the power supply line 36, thereby transmitting a complete sinusoidal power signal for a time after the reset switch 244 has been momentarily closed. It will be appreciated, then, that the reset switch 244 takes priority over both the "start A" and "start B" signals, whether initiated manually or automatically.

Energization of the "reset" relay 168, also closes another set of contacts of switch 240, and thereby applies power from line 36 to an indicator light 252, through a resistor 254. Accordingly, the light 252 will be illuminated while the "reset" signal is being transmitted on line 54.

As shown in FIG. 3, the "start/reset" signals on line 54 and the common signal transmission line 40 are transmitted to two relays 260 and 262 in the satellite unit 12 (FIG. 1). In particular, the common line 40 is connected to one terminal of each of the relays 260 and 262, and the start/reset line 54 is connected to the positive terminal of a diode 264, the negative terminal of which is connected to the other terminal of relay 260, and is also connected to the negative terminal of another diode 266, the positive terminal of which is connected to the other terminal of relay 262. A further diode 268 is connected across the terminals of relay 260, with its negative terminal connected to the common line 40, and yet another diode 170 is connected across the terminals of relay 262, with its negative terminal connected to the common line 40. It will be readily appreciated from FIG. 3 that the positive-going halves of the signal on line 54 will be blocked from relay 262 by diode 266, but will be transmitted to relay 260 to energize this relay. Similarly, the negative-going halves of the signal wave on line 54 will be blocked from relay 260 by diode 264, but will energize relay 262. Relay 260, then, is the 'A' relay at the satellite unit, and relay 262 is the 'B' relay.

Relay 260 is coupled with a double-pole double-throw switch 272, and relay 262 is coupled with a double-pole double-throw switch 274. To facilitate a description of the operation of the circuit, the terminals of the switches 272 and 274 have been numbered as follows: The terminals associated with the two moving contacts are designated terminals #1 and #2, the fixed contacts associated with terminal #1 are designated #3 and #4, and the fixed contacts associated with terminal #2 are designated #5 and #6. Interconnected with switches 272 and 274 is an A/B selector switch 276, which is also a double-pole double-throw switch. The terminals of this switch have also been numbered 1–6 consistent with the numbering of switches 272 and 274. Thus, in the 'A' position, switch 276 has terminal #1 connected with terminal #4 and terminal #2 connected with terminals #6, and in the 'B' position terminal #1 is connected with terminal #3 and terminal #2 is connected with terminal #5. The cross-hatched portions of switch 276 indicate the 'A' position, and the unshaded portions indicate the 'B' position.

Switches 272, 274 and 276 are interconnected in the following manner: Terminal #3 of switch 272 is connected to terminal #2 of switch 276, terminal #4 of switch 272 is connected to terminal #4 of switch 276, terminal #5 of switch 272 has no connection, terminal #6 of switch 272 is connected to terminal #6 of switch 274, terminal #1 of switch 276 is connected to terminal #3 of switch 274, terminal #5 of switch 276 is connected to terminal #4 of switch 274, terminals #3 and #6 of switch 276 have no connection, and terminal #5 of switch 274 has no connection.

The other revelevant components of the satellite unit illustrated in FIG. 3 are a double-throw switch 278 and a two-part wafer switch 280a and 280b. Wafer 280a has two contacts 282 and 284 which are electrically disconnected only when the wafer is in a "home" position. In any other position, the contacts 282 and 284 are electrically connected. Wafer 280b has a wiper contact 286 and seven uniformly spaced contacts 288 connected to the lines 64 to the valve solenoids. In the "home" position, there is no electrical connection between contact 286 and any of the contacts 288. In any other position, there is electrical contact between contact 286 and one of the contacts 288. The wafer switches are driven mechanically from a station dial, indicated diagrammatically at 290, which is, in turn, driven by the motor M2.

Again, to facilitate a description of operation of this circuit, switch 278 has its terminals designated #1 for the moving contact, and #2 and #3 for the fixed contacts.

As already described, power is supplied on lines 42 and 44, and line 42 is connected through a fuse 90 and main power switch 92, and thence to a line 94 to the switch contacts 46. Electrical power is also supplied over line 292, connecting line 94 with terminal #1 of switch 272, and by line 294 from switch 92 to contact 284 of wafer 280a. Contact 282 of the wafer 280a is connected by line 296 to terminal #1 of switch 278, and by line 298 to terminal #2 of switch 272. Terminal #3 of switch 278 is connected by line 300 to contact 286 of wafer 280b, and terminal #1 of switch 278 is also connected, by line 302, to terminal #1 of switch 274. Finally, terminal #2 of switch 274 is connected by line 304 to terminal #2 of switch 278, which, in turn, is connected by line 306 to the motor M2, the other terminal of which is connected back to the other power line 44.

As has already been described, a "start A" signal comprising positive portions of the power signal, on line 54, will energize the 'A' relay 260 and actuate its switch 272, and a "start B" signal will energize the 'B' relay 262 and actuate its switch 274. Furthermore, a "reset" signal, comprising a complete sine wave, will energize both 'A' and 'B' relays 260 and 262, and actuate both switches 272 and 274 simultaneously. The effect of the "start A", "start B", and "reset" signals on the operation of the motor M2 will now be discussed in more detail.

Assuming that for the moment that the selector switch 276 is in the 'A' position, i.e., terminals #1 and #4 are connected, it will be seen that power is supplied through line 292 to terminal #1 of switch 272, through terminal #4 of switch 272, assuming the 'A' relay 260 is energized, then through terminals #4 and #1 of switch 276 and terminals #3 and #1 of switch 274, which is assumed not to be actuated. Following this connection further, power is transmitted over line 302 through terminals #2 and #1 of switch 278, and thence to the motor M2 by line 306. Thus the motor M2 is energized to drive the station dial and advance the unit to next station. When the next station is reached, switch 278 is actuated mechanically by means (not shown) coupling the station dial 290 to the switch 278. This movement of switch 278 disconnects power from the motor M2, and stops advancement of the station dial 290. After the 'A' relay 260 is de-energized on cessation of the "start A" signal on line 54, and on completion of a timed irrigation period, the switch 278 is returned to its normal position, i.e., with terminals #1 and #2 connected.

Note that, if the selector switch 276 is in the 'B' position, and a "start A" signal is received over line 54 to energize the 'A' relay 260, the transmission of power is blocked at terminal #4 of switch 276, and the motor M2 is, therefore, not energized. With selector switch 276 in the 'B' position and the 'B' relay 262 energized, however, power is then transmitted from line 94 through line 292, through terminals #1 and #3 of switch 272, through terminals #2 and #5 of switch 276, through terminals #4 and #1 of switch 274, and thence by line 302 to terminal #1 of switch 278. As before, switch 278 is normally in the position connecting terminals #1 and #2, and therefore connecting power from line 302 to line 306 to the motor M2. When advancement to the mext station is complete, switch 278 is moved to the position connecting terminals #1 and #3, and the motor M2 is de-energized.

When the station dial 290 reaches a new station, switch 278, as has been described, switches to a position electrically connecting terminals #1 and #3. At this point, power is transmitted over line 294, through contacts 284 and 282 of wafer 280a, assuming the wafer is not in the "home" position, and thence over line 296 to terminal #1 of switch 278. Since terminal #1 is at this time connected to terminal #3 of switch 278, power is transmitted over line 300 to the wiper contact 286, and thence to the appropriate one of the contacts 288 for applying a signal to a valve solenoid on one of the lines 64. At the completion of a timed irrigation period, as determined by the motor M1, the switch 278 is returned to its position connecting terminals #1 and #2, and power is disconnected from the wafer 280b, thereby terminating irrigation to that station.

When both relays 260 and 262 are energized, as by a "reset" signal on line 54, power is transmitted over line 294 through contacts 284 and 282 of wafer 280a, over line 298, through terminals #2 and #6 of switch 272, through terminals #6 and #2 of switch 274, and thence over lines 304 and 306 to the motor M2. In this configuration, the motor M2 will remain energized until the station dial has driven the afer 280a and 280b to the "home" position. Then the electrical connection between contacts 282 and 284 will be broken, and the motor M2 will be de-energized, leaving the satellite unit in its desired "home" position.

The components employed in the aforedescribed circuits may, of course, be selected from those offered by various manufacturers. However, to facilitate a complete understanding of the presently preferred embodiment of the invention, component values and part numbers have been provided on the drawings. In particular, the timers 70 (FIG. 2), and 158, 160 and 162 (FIG. 7) all have part number RC556 or RM556, manufactured by Raytheon Semiconductor Division, Mountain View, Cal. The flip-flops 154 and 156 (FIG. 7) have part number 34013, NAND gates 146 and 148 have part number 34011, and the NOR gates 150 and 152 have part number 34011, all manufactured by Fairchild Camera and Instrument Corporation, Semiconductor Components Group, Mountain View, Cal. The diodes in FIGS. 2 and 7 have part numbers 1N4148, except for diodes 226 and 228 (FIG. 7), which have part number 1N4006. All of the diodes in FIG. 3 also have part number 1N4006. All of the relays are of 1kΩ impedance.

The resistance values of resistors 22a–22m will depend upon the relative ratios of irrigation times desired, but the following values give multiplying factors of x1, x2, x4, x6 ... x18, x20 and x24 at the respective positions of the selector switch 14 (FIG. 2):

Resistor 22a — 76.8kΩ
Resistor 22b — 15.4kΩ
Resistor 22c — 9.2kΩ
Resistor 22d — 13.7kΩ
Ressistor 22e — 16.2kΩ
Resistor 22f — 22.1kΩ
Resistor 22g — 30.9kΩ
Resistor 22h — 46.04kΩ
Resistor 22i — 76.8kΩ
Resistor 22j — 154kΩ
Resistor 22k — 464kΩ
Resistor 22l — 921kΩ
Resistor 22m — 1kΩ

It will be appreciated from the foregoing that the present invention represents a significant advance in the field of irrigation control systems of the master-satellite type. In particular, the invention provides a novel technique for proportionately varying the timing of a plurality of irrigation valve stations from a single control which may be centrally located in the master unit. Moreover, a system is provided for transmitting control signals to a plurality of satellite units, to start one of two groups of such units, or to reset all units to a starting or "home" position. Although particular embodiments of the invention have been described in detail for purposes of illustration, it will be appreciated that various modifications may be made without departing from the spirit and scope of the invention. Accordingly, the invention is not to be limited except as by the appended claims.

We claim:
1. Remote proportional timing apparatus for controlling an irrigation system having master and satellite control units, said apparatus comprising:
    timing signal source means located at a master control unit, for supplying timing signals which will in part determine the durations of energization of a plurality of valves;
    timing signal utilization means at a satellite control unit, connected to operate in response to the timing signals transmitted from said timing signal source means and including means for controlling the durations of energization of the plurality of valves; and timing signal conductor means connecting said timing signal source means to said timing signal utilization means; and means for controlling said timing signal source means, thereby to vary the rate of operation of said timing signal utilization means, and to vary the durations of energization of the valves all to the same proportionate degree.

2. Remote proportional timing apparatus as set forth in claim 1, wherein:
said timing signal source means includes timing circuit means for generating a timing signal having two states; and
said means for controlling said timing signal source means includes means for varying the proportion of time that said timing signal is in one of the two states.

3. Remote proportional timing apparatus as set forth in claim 2, wherein:
said timing signal has a constant frequency and period; and
said means for varying the proportion of time that the signal is in one state includes variable impedance means for varying the time that the signal is in one state while maintaining a constant period.

4. Remote proportional timing apparatus as set forth in claim 2, wherein:
said timing signal comprises a train of pulses of constant width;
said means for varying the proportion of time that the signal is in one state comprises means for varying the frequency of the signal.

5. A method for controlling from a master control unit the durations of energization of a plurality of irrigation valves switched on and off from a number of satellite units, said method comprising the steps of:
generating at the master unit a two-state timing signal;
continuously transmitting the timing signal to the satellite units; and
utilizing the timing signal received at each satellite unit to control the determination of valve irrigation times.

6. A method as set forth in claim 5, and further including the steps of:
varying the proportion of time that the timing signal is in a particular state; and
varying the duty cycle of a timing motor at each satellite in accordance with the state of the timing signal.

7. In a master-satellite irrigation control system, apparatus for actuating a selected group of a satellite units to advance the units through their sequence of valve operations, said apparatus comprising:
a single pair of control signal conductors between a master unit and a plurality of satellite units;
means at the master unit for generating a "start" control signal of a first kind for transmission over said pair of conductors when satellites of one designation are to be started in their sequences of valve operations, and for generating a "start" signal of a second kind when satellites of a different designation are to be started in their sequences of valve operations;
means also at the master unit for generating a "reset" signal on said same pair of conductors when it is desired to reset all of the satellite units to a "home" position;

means at each satellite unit for decoding said "start" signals of the first and second kinds and said "reset" signals; and means responsive to said decoding means, for starting the sequence of valve operations at each satellite unit, or advancing each satellite unit to its home position, as required.

8. Apparatus as set forth in claim 8, wherein said means for generating "start" signals of the first and second kind includes:
means for supplying an alternating-current signal;
rectifier means connectable to conduct the alternating-current signal in only a selected direction; and
switching means for selectively connecting said means for supplying the alternating-current signal through said rectifier means to said pair of control signal conductors, to transmit in only a selected direction along said conductors, the transmission in respective directions being equivalent to said "start" control signals of the first and second kinds.

9. Apparatus as set forth in claim 8, wherein said decoding means includes:
further rectifier means at each satellite unit;
first and second switching means at each satellite unit, operative in response to receipt of said "start" control signals of the first and second kinds, respectively; and
selector switch means coupled with said first and second switching means, for selecting the group designation of each satellite unit.

10. Apparatus as set forth in claim 9, wherein:
said means for generating a "reset" signal includes manually initiated means for connecting said means for supplying an alternating-current signal directly to said pair of control signal conductors; and
said first and second switching means in each satellite unit are operated simultaneously in response to operation of said means for generating a "reset" signal.

11. Apparatus as set forth in claim 8, wherein said switching means includes:
automatically actuated switching means to initiate transmission of "start" control signals of the first and second kinds in accordance with a programmed sequence of operations; and
manually actuated switching means to initiate transmission of "start" control signals of the first and second kinds.

12. Apparatus as set forth in claim 7, and further including:
timing signal source means at the master unit;
a timing signal conductor from the master unit to the satellite units;
timing signal utilization means at each satellite unit connected to operate in response to signals transmitted from said timing signal source means and including means for controlling the durations of energization of a plurality of remote valve stations; and
means for controlling said timing signal source means, to vary the rate of operation of said timing signal utilization means, whereby the irrigation times of all of the valves in the system can be adjusted to the same proportionate degree by operating said means for controlling said timing signal source means.

13. Remote proportional timing apparatus for controlling an irrigation system having master and satellite control units, said apparatus comprising:

timing signal source means at a master control unit, and including timing circuit means for generating a timing signal having two states and a constant frequency and period;

timing signal utilization means at a satellite control unit, connected to operate in response to signals transmitted from said timing signal source means and including means for controlling the durations of energization of a plurality of valve stations; and timing signal conductor means connecting said timing signal source means to said timing signal utilization means; and means for controlling said timing signal source means, thereby to vary the rate of operation of said timing signal utilization means, and to vary the durations of energization of the valves all to the same proportionate degree, said means for controlling said timing signal source means including means for varying the proportion of time that said timing signal is in one of the two states;

and wherein said means for varying the proportion of time that the signal is in one state includes variable impedance means for varying the time that the signal is in one state while maintaining a constant period, said timing signal source means includes relay means responsive to the two-state timing signal to control flow of a power signal to the satellite unit along said timing signal conductor means, and said timing signal utilization means includes a synchronous motor responsive to signals received on said timing signal conductor means, whereby the duty cycle of said motor may be controlled by varying said variable impedance means, thereby to vary the durations of irrigation at the valve stations.

14. Remote proportional timing apparatus for controlling an irrigation system having master and satellite control units, said apparatus comprising:

timing signal source means at a master control unit, and including timing circuit means for generating a timing signal having two states;

timing signal utilization means at a satellite control unit, connected to operate in response to signals transmitted from said timing signal source means and including means for controlling the durations of energization of a plurality of valve stations; and timing signal conductor means connecting said timing signal source means to said timing signal utilization means; and means for controlling said timing signal source means, thereby to vary the rate of operation of said timing signal utilization means, and to vary the durations of energization of the valves all to the same proportionate degree, said means for controlling said timing signal source means including means for varying the proportion of time that said timing signal is in one of the two states; and wherein said timing signal comprises a train of pulses of constant width, said means for varying the proportion of time that the signal is in one state comprises means for varying the frequency of the signal said timing signal utilization means includes pulse counting means and comparator means for determining the durations of irrigation at the valve stations.

15. Remote proportional timing apparatus for controlling an irrigation system having master and satellite control units, said apparatus comprising:

timing signal source means at a master control unit, and including timing circuit means for generating a timing signal having two states;

timing signal utilization means at a satellite control unit, connected to operate in response to signals transmitted from said timing signal source means and including means for controlling the durations of energization of a plurality of valve stations; and timing signal conductor means connecting said timing signal source means to said timing signal utilization means, and means for controlling said timing signal source means, thereby to vary the rate of operation of said timing signal utilization means, and to vary the duration of energization of the valves all to the same proportionate degree, said means for controlling said timing signal source means including means for varying the proportion of time that said timing signal is in one of the two states; and wherein said timing signal comprises a train of pulses of constant width, said means for varying the proportion of time that the signal is in one state comprises means for varying the frequency of the signal, said timing signal source means includes relay means responsive to the two-state timing signal to control the flow of a power signal along said timing signal conductor means, and said timing signal utilization means includes a synchronous motor responsive to signals received on said timing signal conductor means, whereby the duty cycle of said motor may be controlled by varying said means for varying the frequency of the timing signal, thereby to vary the duration of irrigation at the valve stations.

16. A method for controlling from a master control unit the durations of energization of a plurality of irrigation valves switched on and off from a number of satellite units, said method comprising the steps of:

generating at the master unit a two-state timing signal;

transmitting the timing signal to the satellite units;

utilizing the timing signal received at each satellite unit control the determination of valve irrigation times;

varying the frequency of the timing signal; and measuring valve irrigation times by counting timing signal pulses at the satellite units.

* * * * *

UNITED STATES PATENT AND TRADEMARK OFFICE
CERTIFICATE OF CORRECTION

PATENT NO. : 4,101,786
DATED : July 18, 1978
INVENTOR(S) : RICHARD L. RUGGLES and VINOD PANDAY It is certified that error appears in the above-identified patent and that said Letters Patent are hereby corrected as shown below:

Column 1, line 52, delete "1".

Column 2, line 68, "two-stage" should be --two-state--.

Column 8, line 39, "voltagelevel" should be --voltage level--.

Column 11, line 14, "146" should be --246--;
         line 20, "lline" should be --line--;
         line 48, "170" should be --270--.

Column 12, line 22, "revelevant" should be --relevant--.

Column 13, line 62, "afer" should be --wafer--.

Column 15, line 52, delete second occurrence of "a".

Column 16, line 8, "8" should be --7--.

Column 18, line 59, after "unit" insert --to--.

Signed and Sealed this

Sixth Day of March 1979

[SEAL]

Attest:

RUTH C. MASON
Attesting Officer

DONALD W. BANNER
Commissioner of Patents and Trademarks